July 15, 1947.  W. S. KALS  2,424,176
PORTRAIT CAMERA WITH AUTOMATIC IRIS DIAPHRAGM OPERATION
Filed Jan. 23, 1946  3 Sheets-Sheet 1

Inventor:
William S. Kals,
by Emery, Booth, Townsend, Miller & Neidner
Attys

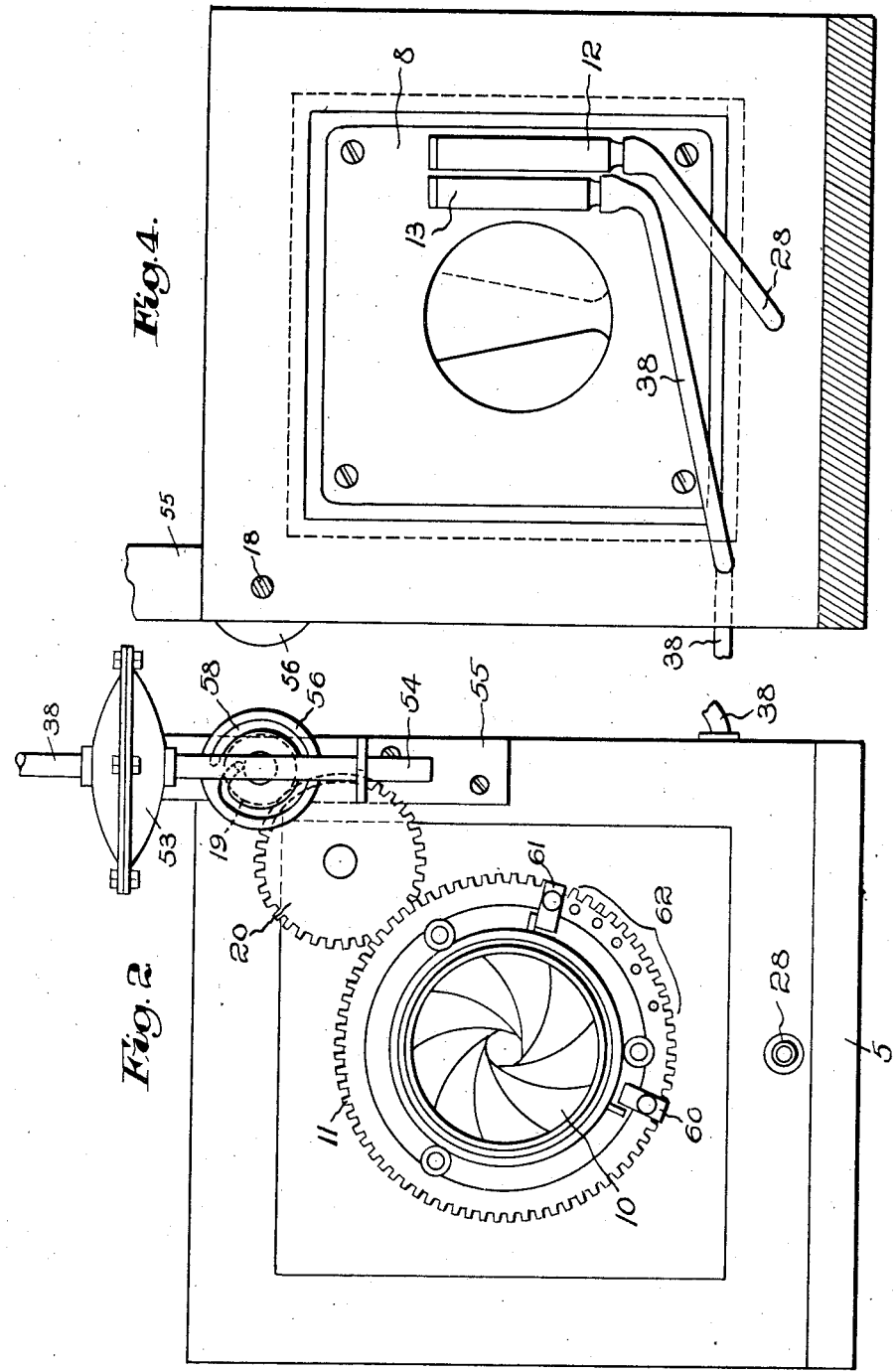

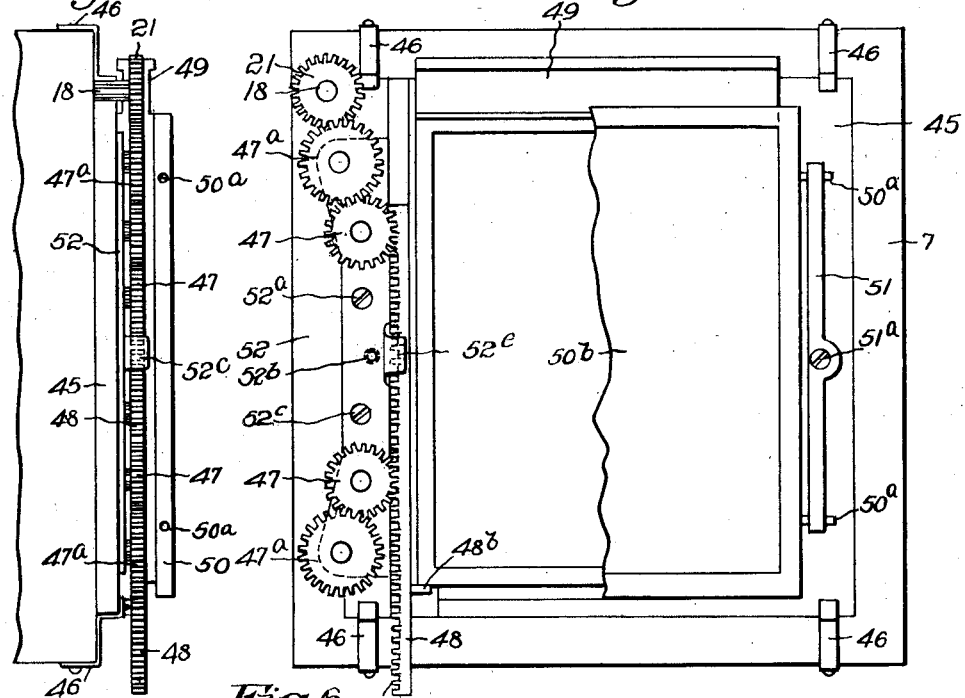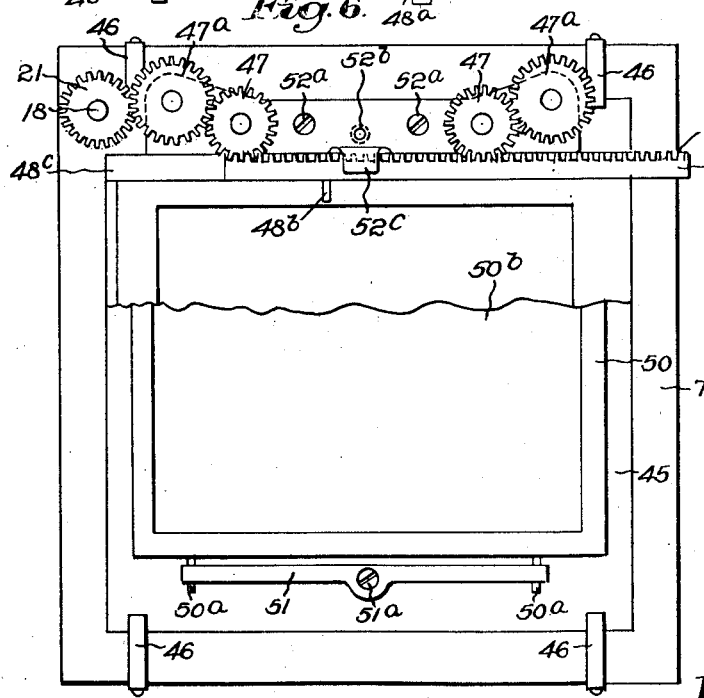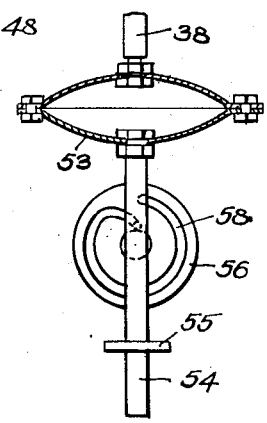

Patented July 15, 1947

2,424,176

UNITED STATES PATENT OFFICE 2,424,176

PORTRAIT CAMERA WITH AUTOMATIC IRIS DIAPHRAGM OPERATION

William S. Kals, Vancouver, British Columbia, Canada, assignor to Graflex, Inc., Rochester, N. Y., a corporation of Delaware Application January 23, 1946, Serial No. 642,911

17 Claims. (Cl. 95—64)

This application is a continuation in part of my co-pending application Ser. No. 585,862, filed March 31, 1945, and of my co-pending application Ser. No. 538,133, filed May 31, 1944, now Patent No. 2,397,742, April 2, 1946. This application is filed to rectify certain minor mechanical defects in the mechanism disclosed in my said applications, and is otherwise an essential reproduction of the disclosure in my said application Ser. No. 585,862, and is for the same invention that was intended to be presented and was presented in and covered by said application Ser. No. 585,862, excepting for said minor mechanical defects, and the claims presented herewith include broad claims that were presented in said application Ser. No. 585,862 with certain additional claims to the herein disclosed subject-matter.

This invention relates to portrait or view cameras having automatic iris diaphragm operation, and wherein means are provided to support large sensitized plates in such manner as to take pictures either horizontally or vertically, and wherein for this purpose there is provided a sensitized plate holder or carrier that may be arranged vertically or horizontally, and in either position may bring about the operation of the iris diaphragm so as partially to close down the latter for making the exposure and to open the same to full open position when the sensitized plate holder is removed after exposure, and also to operate the camera shutter.

In order that the principle of the invention may be readily understood, I have disclosed a single embodiment thereof in the accompanying drawings, wherein—

Fig. 2 is a front elevation of the structure shown in Fig. 1 and also showing the means for operating the camera shutter;

Fig. 3 is a detail in side elevation with parts broken away of the construction shown at the right-hand end of Fig. 1;

Fig. 4 is an elevation showing the closed shutter and a portion of the operating means therefor;

Fig. 5 is a rear elevation of the camera showing the combined ground glass and film or plate holder in one of its two positions, namely, its upright position;

Fig. 6 is a view similar to Fig. 5, but showing the combined ground glass and film or plate holder in its other position, that is, its horizontal position; and Fig. 7 is a detail partly in elevation and partly in section representing a portion of the means for operating the camera shutter.

Figure 1:
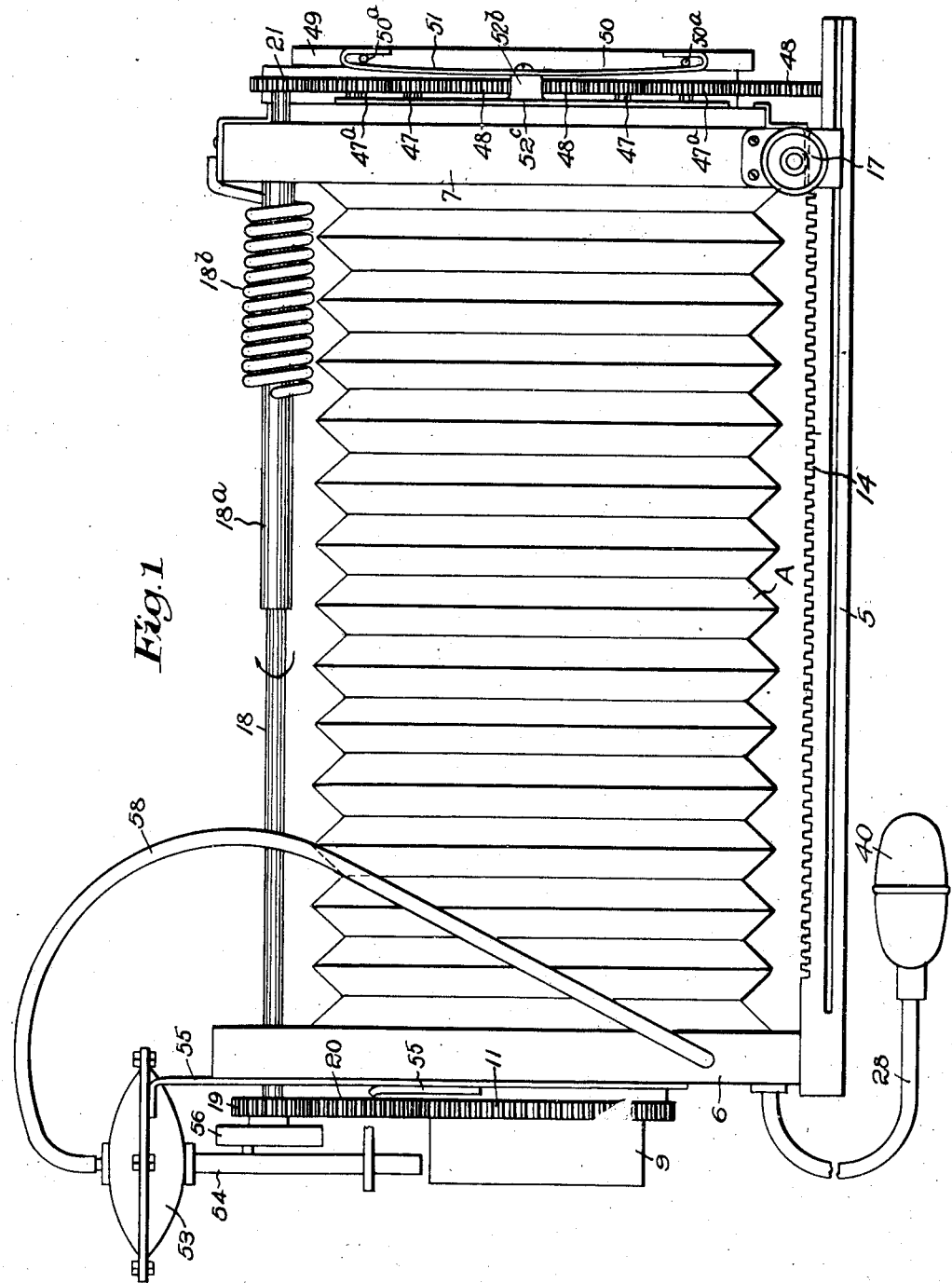
Fig. 1 is a side elevation of a camera having my invention applied thereto, the shutter operating pump being shown in position.

This embodiment of the invention relates to cameras of the type used for taking portraits, which requires a number of independent manual operations in the taking of each picture, particularly for focusing the camera on the subject, and requiring the positioning of the ground glass in place for focusing and the opening of the iris type diaphragm and the opening of the shutter, and then the closing down of the iris diaphragm and the closing of the shutter after completing the focusing operation, and then the positioning of the sensitized plate or film pack in position for picture taking.

It is the primary object of this embodiment of my invention to provide a camera of the character stated wherein the number of independent manual operations will be reduced to a minimum and which permits portraits to be taken in much less time and with less chance of plate or film spoiling.

In my co-pending application Ser. No. 538,133, now Patent No. 2,397,742, I have represented a carrier manually movable transversely of the camera at the rear thereof and having an opening for and receiving the ground glass and also an opening for and receiving the sensitized plate or film pack holder, which carrier is operatively connected up to both the iris diaphragm operating mechanism and the camera shutter. In the present application, instead of the transversely movable carrier, I have provided a carrier or panel which is removably secured to the rear panel of the camera in either vertical or horizontal position, and I have provided means similar to that disclosed in said application Ser. No. 538,133 for operating at the proper time the iris diaphragm mechanism and the camera shutter. I herein employ the term "carrier" in a broad sense and as including a panel or the like.

Referring in detail to the drawings, the base of the camera is indicated at 5 and has permanently mounted on one end thereof a front upright panel 6 and a rear panel 7, which latter is slidably mounted on the base for adjustment toward and from the front panel. Both panels 6 and 7 have aligned openings. The opening of the front panel is controlled by the conventional type of shutter 8 and a diaphragm mechanism 9 including the usual adjustable iris diaphragm 10 operated by the rotation of a gear 11 in opposite directions. The diaphragm mechanism may also include the usual lens (not shown) positioned on either side of the iris diaphragm. The shutter mechanism includes the conventional instantaneous operating pump 12 and the time operating pump 13, both shown in Fig. 4. This type of shutter mechanism is commercially known by the name of "Packard." A bellows extension A connects the front and rear panels 6 and 7 to exclude light and to permit the rear panel 7 to be adjusted toward and from the front panel 6.

The rear panel 7 is adjusted on the base 5 through the use of a rack 14 meshing with gears secured on an operating shaft preferably provided with two finger knobs 17, one of which is shown in Fig. 1.

An operating shaft 18 for the gear 11 that operates the iris diaphragm 10 is journaled in the front and rear panels 6 and 7 and includes two telescopic sections 18 and 18a, as shown in Fig. 1. The two sections of the shaft are splined together, and the left-hand section viewing Fig. 1 has a gear 19 fast thereon, said gear meshing with a gear 20 journaled on the front panel 6 and which gear 20 meshes with the gear 11 of the iris diaphragm mechanism. The other section 18a of the shaft (that is, the right-hand section viewing Fig. 1) has secured thereto a gear 21.

In the present embodiment of the invention, the camera is adapted to have used in conjunction therewith large sensitized plates which may be positioned for taking pictures horizontally or vertically. In this form of the invention, a carrier or panel 45, best shown in Figs. 5 and 6, is removably secured onto the rear panel 7, as at 46, 46, so that the said carrier or panel 45 may be arranged vertically or horizontally, and it has journaled thereon two groups of gears 47, 47a, as will be subsequently described in detail. Either of said two groups of gears 47, 47a will be made to mesh with the gear 21 and to function, depending upon whether the carrier or panel 45 is inserted vertically or horizontally. Both groups of the gears 47, 47a are engaged by the teeth 48a of a slidable rack 48 that is provided upon its opposite edge with an inwardly projecting pin or lug 48b. The said rack 48 fits slidably in a groove 48c extending lengthwise of the carrier or panel 45, as shown in Figs. 5 and 6.

The sensitized plate holder 49 is shown in position at the extreme right of Fig. 1. It is slidable in and out between the carrier or panel 45 and a suitable focusing or ground glass holder. The said sensitized plate holder 49 is held in position by the usual light-lock member that is a part of all holders and which fits into a notch provided in the focusing or ground glass 50, as shown in Fig. 1, and also in Figs. 3 and 5. As there shown, the light-lock member is a thin, metal, spring-like strip 51 pivotally secured mid-length by a screw 51a and having bent-over ends, shown in Fig. 1, enclosing the two pins 50a, 50a, laterally extending from the ground glass holder. Such usual construction permits the ground glass carried by the ground glass holder 50 to be removed from the camera whenever desired, and also permits the sensitized plate-holder 49 to be moved into and out of picture-taking position.

It has been stated that the rack 48 is slidably mounted in the groove 48c of the carrier or panel 45. The said rack is spring loaded or forced in the direction in which the holder 49 is moved when removing it from the camera and for this purpose I have provided a coiled spring 18b, one end of which, as shown in Fig. 1, is secured to the section 18a of the shaft 18 and the other end of which is secured to the top of the rear panel 7.

When the carrier or panel 45 is inserted in either a vertical position as shown in Fig. 5 or a horizontal position as shown in Fig. 6, and the sensitized plate holder 49 is pushed all the way home in the said carrier or panel 45, the latter action will cause the pin or projection 48b of the rack 48 to be moved in a downward direction viewing Fig. 5, where the sensitized plate holder 49 is positioned vertically or to the left viewing Fig. 6 where the said holder 49 is positioned horizontally. Thus the slidable rack 48 will be moved lengthwise and will cause both the gears 47 to be turned in a clockwise direction. This will turn the idler gears 47a in a contraclockwise direction, and one of the said idler gears 47a will be in mesh with the gear 21 fast on the telescoping shaft 18, the idler gear 47a so in mesh depending upon whether the carrier or panel 45 is inserted vertically as shown in Fig. 5 or horizontally as shown in Fig. 6. In either case one of the idler gears 47a will be in mesh with the gear 21 fast on the telescoping shaft 18 and will turn the said shaft 18 in a clockwise direction. This will cause the spiral spring 18b to be further tensioned for effecting return movement of the rack 48 upon removal of the sensitized plate holder 49.

When the carrier or panel 45 is used in a horizontal position, as shown in Fig. 6, the opposite train of gears 47, 47a will be caused to function from those which function when the carrier or panel 45 is inserted vertically. Fig. 6 indicates that the sensitized plate holder 49 has been removed and therefore the coiled spring 18b has caused the telescoping shaft 18a to be turned in a contraclockwise direction, viewing Fig. 6, thus moving the rack 48 to the right viewing said figure, whereas in Fig. 5 the rack 48 is held down by the positioned sensitized plate holder 49.

The said rack 48 is held in place in its groove 48c of the carrier or panel 45 by a finger 52c that is an integral part of a gear support member 52 which latter is attached to a face of the carrier or panel 45 by screws 52a, 52a. As most clearly shown in Figs. 5 and 6, both sets of gears 47, 47a are mounted upon the gear support member 52.

When the sensitized plate holder 49 is placed in picture-taking position in front of the ground glass holder 50, it brings about rotation of the operating telescoping shaft 18 by causing the rack 48 to rotate the gears 47, 47a, and the turning of the shaft 18 operates the iris diaphragm 10 to close the latter down. The said shaft 18 opens the said iris diaphragm 10 to a full open position when the sensitized plate holder 49 is removed.

In the disclosed embodiment of the invention, a diaphragm type pump 53 is employed and is connected to the shutter pump 13, shown in Fig. 4, by a flexible tube 38. The diaphragm portion of the pump 53 has connected thereto a stem 54 guided in its movement by a bracket 55 which, as shown in Figs. 1 and 2, is secured to a face of the panel 6 and has a bent upper end to which a flange of the diaphragm pump 53 is connected.

The described movement of the parts including the turning of the shaft 18 in a contraclockwise direction, viewing Fig. 6, opens the pump diaphragm and will operate the pump 53, causing the shutter to be opened.

A disk-shaped cam 56, shown in Figs. 1, 2, 4 and 7 is secured to the shaft 18 for operating the diaphragm of the pump 53. The said disk-shaped cam 56 is provided with a cam groove 58, shown in Fig. 2 as concentric with the axis of the shaft 18 throughout the greater part of its length but having one end thereof inturned, so as to extend nearly to the shaft 18. The said groove 58 receives a pin 59 laterally extending from the stem 54 of the pump 53, as indicated in Fig. 2.

During the initial rotation of the shaft 18 caused by the sensitized plate holder 49 being moved into picture-taking position (that is, downwardly viewing Fig. 5 or horizontally viewing Fig. 6), the pin 59 travels in the portion of the groove 58 of the cam 56 which is concentric with the axis of rotation of the shaft 18, so as not to operate or affect the diaphragm of the pump 53. However, when the sensitized plate holder 49 nears its picture-taking position in the act of being inserted, the pin 59 travels in the portion of the groove 58 which is eccentric to the axis of rotation of the shaft 18, so as to bring about the sudden operation of the diaphragm of the pump 53 in order to operate the shutter pump 13 shown in Fig. 4, and to bring about the closing of the shutter 8, which has remained open while the pin 59 travels in the portion of the groove 58 which is concentric with the axis of rotation of the said shaft 18.

It will be seen from the foregoing description that when the sensitized plate holder 49 is brought into proper position for taking a picture, the shutter 8 will be closed and that the iris diaphragm 10 is closed. Upon the removal of the sensitized plate holder 49 from the camera, the shutter 8 will open and the iris diaphragm 10 will be moved into open position. The iris diaphragm mechanism 9 is mounted on the front panel 6 for quick removal, as will be evident from Fig. 2.

The usual bulb 40 with its tube 28 for bringing about the operation of the shutter for taking the picture is shown in Fig. 1, and in Fig. 2 are shown dogs 60, 61 for opening and closing the iris diaphragm, and the position of the dog 61 can be adjusted to the different positions indicated by the openings 62.

While the disclosed embodiment of the invention is a portrait camera, my invention is not limited to such type, as my invention may be embodied in a view camera of various types.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera of the portrait or view type having at the front thereof a diaphragm mechanism with adjustable iris in suitable relation to the camera shutter, said camera having at the rear thereof a carrier constructed to be manually positioned either vertically or horizontally for taking pictures in either of said positions and to receive a sensitized plate holder in either of said two positions and provided with two, alternately-functioning groups of gearing, each functioning in one only of said positions respectively and idle in the other position, and with a lengthwise movable rack meshing with said groups of gearing to cause either of said two groups of gearing to function while the other group of gearing is idle, by rotative movement according to the position of said carrier vertically or horizontally, a shaft so cooperatively connected to the iris diaphragm mechanism as to cause the closing down and the opening of said iris diaphragm upon opposite rotative movement of said shaft, said shaft having at the rear of the camera a gear to be engaged by a gear of the then functioning group only of the said two, alternately-functioning groups of gearing on said carrier upon positioning said carrier on the camera and the insertion of the said plate holder and while the other group of gearing is idle, so as to impart rotative movement to said shaft, and thereby to close down said iris diaphragm upon insertion of such plate holder and to open said iris diaphragm upon removal of such plate holder, said plate holder being positionable upon said carrier in either the vertical or the horizontal position of the latter, and engageable with said rack in the positioning of said plate holder on the carrier, to move said rack lengthwise, thereby to cause the functioning of one of said groups of gearing while the other group of gearing is idle, and thus to impart rotative movement to said shaft, and consequently to close down the adjustable iris.

2. A photographic camera of the portrait or view type having at the front thereof a diaphragm mechanism with adjustable iris in suitable relation to the camera shutter, said camera having at the rear thereof a carrier constructed to be manually positioned either vertically or horizontally for taking pictures in either of said positions and to receive a sensitized plate holder in either one of said positions and cooperating iris-closing-and-opening connections between said diaphragm mechanism of the adjustable iris and said carrier and its plate holder when the carrier and its plate holder are positioned in either one of said two positions, to close down and also to open said iris with the said carrier and its plate holder positioned in either of said two positions, by the respective acts of inserting and of withdrawing the said plate holder from said carrier.

3. A photographic camera of the portrait or view type having at the front thereof a diaphragm mechanism with adjustable iris in suitable relation to the camera shutter, said camera having at the rear thereof a carrier constructed to be manually positioned either vertically or horizontally for taking pictures in either of said positions, and cooperating iris-closing-and-opening connections between said diaphragm mechanism of the adjustable iris and said carrier when the latter is positioned in either one of said two positions, for closing and for opening said iris with the said carrier positioned in either of said two positions, said camera including a plate holder positionable either vertically or horizontally on said carrier and upon its being so positioned engaging and operating a part of the cooperating iris-closing-and-opening connections for the said adjustable iris to cause said iris partially to close upon insertion of said plate holder and to open to full position when the plate holder is withdrawn.

4. A photographic camera of the portrait or view type having at the front thereof a diaphragm mechanism with adjustable iris in suitable relation to the camera shutter, said camera having at the rear thereof a carrier constructed to be manually positioned either vertically or horizontally for taking pictures in either of said positions, and cooperating iris-closing-and-opening connections between said diaphragm mechanism of the adjustable iris and said carrier when the latter is positioned in either one of said two positions, for closing and for opening said iris with the said carrier positioned in either of said two positions, said camera including a plate holder positionable either vertically or horizontally on said carrier and, upon its being so positioned, engaging and operating a part of the cooperating iris-closing-and-opening connections for the said adjustable iris to cause said iris partially to close upon insertion of said plate holder and to open to full position when the plate holder is withdrawn, said cooperating connections including a shaft so cooperatively connected to the iris diaphragm mechanism as to cause the closing down and the opening of the iris diaphragm upon opposite rotative movement of said shaft, said shaft having a gear at the rear of the camera, and gearing upon said carrier, a portion of said gearing being engageable with said gear in the vertical position of said carrier and another portion of said gearing being engageable with said gear in the horizontal position of said carrier.

5. A photographic camera of the portrait or view type having at the front thereof a diaphragm mechanism with adjustable iris in suitable relation to the camera shutter, said camera having at the rear thereof a carrier constructed to be manually positioned either vertically or horizontally for taking pictures in either of said positions, and cooperating iris-closing-and-opening connections between said diaphragm mechanism of the adjustable iris and said carrier when the latter is positioned in either one of said two positions, for closing and for opening said iris with the said carrier positioned in either of said two positions, said camera including a plate holder postionable either vertically or horizontally on said carrier and, upon its being so positioned, engaging and operating a part of the cooperating connections for the said adjustable iris, to cause said iris partially to close upon insertion of said plate holder and to open to full position when the plate holder is withdrawn, said carrier having gearing operated by the positioning of said plate holder and constituting a part of said cooperating connections, the latter also including a shaft extending lengthwise the camera and gears thereon engaging respectively said diaphragm mechanism for closing and for opening said iris and a gear of said carrier in either of said positions of the latter.

6. A photographic camera in accordance with claim 2, but wherein the camera shutter is provided with a time pump, and wherein an operating member for said time pump is carried by the said cooperating connections between the diaphragm mechanism of the adjustable iris and said carrier, to close said shutter when the iris diaphragm is closed down and to open the shutter when the iris diaphragm is moved into open position.

7. A photographic camera in accordance with claim 1, but wherein the said shaft is provided with an operating cam, and wherein the camera shutter is provided with a time pump, and wherein there are operating connections between said time pump and said cam, to close said shutter when the iris diaphragm is closed down and to open the shutter when the iris diaphragm is moved into open position.

8. A photographic camera in accordance with claim 1, but wherein the said shaft is provided with a rotary cam having a cam groove, and wherein there is provided a diaphragm pump connected to the camera shutter and also having a stem with a formation engaging said cam groove, the latter being of such shape as to operate the camera shutter, so as to close said shutter when the iris diaphragm is closed down and to open the shutter when the iris diaphragm is moved into open position.

9. In combination, a photographic camera of the portrait or view type having at the front thereof a diaphragm mechanism with adjustable iris in suitable relation to the camera shutter, said camera having at the rear thereof a carrier, said camera including a sensitized plate holder slidably positionable either vertically or horizontally on said carrier, said carrier being removably positionable on the rear panel of the camera in either upright or horizontal position and having a rack operatively connected with the said diaphragm mechanism of the adjustable iris and lengthwise slidably mounted on a face of said carrier adjacent a lateral edge thereof, and having a pin-like formation extending therefrom to be engaged by the sensitized plate holder when the latter is slid into its functioning position upon the carrier, thereby to move said rack longitudinally in the direction of the inserting movement of the sensitized plate holder, so as to cause said rack to function, operative connections between said rack and said diaphragm mechanism, said carrier also having mounted thereon adjacent to and laterally outside of said rack two groups of gears, said groups of gears forming part of said operative connections, one member of each of said groups being in mesh with said rack, one of said groups of gears being caused by said rack to act upon the diaphragm mechanism partially to close the iris upon insertion of the plate holder when said carrier is placed in an upright position on the rear panel of the camera and the other group of gears being caused by said rack to act upon the diaphragm mechanism partially to close the iris upon insertion of the plate holder when said carrier is placed in a horizontal position on the rear panel of the camera.

10. A photographic camera in accordance with claim 2, but wherein said carrier is provided with a rack and gearing, said gearing being operatively connected through said cooperating iris-closing-down and opening connections with the diaphragm mechanism of the adjustable iris, thereby to open and to close down said iris.

11. A photographic camera in accordance with claim 2, but wherein said diaphragm mechanism for closing down and for opening said iris includes a shaft extending lengthwise the camera and having a gear adjacent said carrier, there being gearing upon said carrier meshing with said gear upon said shaft to cause said diaphragm mechanism to function, thereby to close down and to open said iris.

12. A photographic camera in accordance with claim 2, but wherein said carrier is adapted to have such sensitized plate holder slid thereinto and has a rack operatively connected with the diaphragm mechanism of the adjustable iris, said rack being slidably mounted on a face of said carrier adjacent a lateral edge thereof, said rack having a pin-like formation extending therefrom to be engaged by such sensitized plate holder when the latter is slid into its functioning position on said carrier, thereby to move said rack longitudinally in the direction of the inserting movement of such sensitized plate holder, so as to cause said rack to function and thereby to act upon said diaphragm mechanism of the adjustable iris.

13. A photographic camera in accordance with claim 2, but wherein said carrier is adapted to have such sensitized plate holder slid thereinto and has a rack operatively connected with the diaphragm mechanism of the adjustable iris, said rack being slidably mounted on a face of said carrier adjacent a lateral edge thereof, said rack having a pin-like formation extending therefrom to be engaged by such sensitized plate holder when the latter is slid into its functioning position on said carrier, thereby to move said rack longitudinally in the direction of the inserting movement of such sensitized plate holder, so as to cause said rack to function and thereby to act upon said diaphragm mechanism of the adjustable iris, said carrier also having mounted thereon two groups of gears, one of which groups functions when the carrier is in vertical position and the other of which functions when the carrier is in horizontal position, one member of each group being in mesh with said rack, and one member of each group, when in functioning position having a meshing relation with the cooperating iris-closing-and-opening connections to the diaphragm mechanism of the adjustable iris.

14. A photographic camera in accordance with claim 2, but wherein said carrier is adapted to have such sensitized plate holder slid thereinto and has a rack operatively connected with the diaphragm mechanism of the adjustable iris, said rack being slidably mounted on a face of said carrier adjacent a lateral edge thereof, said rack having a pin-like formation extending therefrom to be engaged by such sensitized plate holder when the latter is slid into its functioning position on said carrier, thereby to move said rack longitudinally in the direction of the inserting movement of such sensitized plate holder, so as to cause said rack to function and thereby to act upon said diaphragm mechanism of the adjustable iris, the said cooperating iris-closing-and-opening connections to the diaphragm mechanism of the adjustable iris including a shaft extending lengthwise the camera and having a spring connected thereto so as to be tensioned by the act of sliding such sensitized plate holder into its functioning position on said carrier, whereby upon the removal of such sensitized plate holder from its functioning position on said carrier the said rack is returned to its first position.

15. A photographic camera in accordance with claim 2, but wherein said carrier is adapted to have such sensitized plate holder slid thereinto and has a rack operatively connected with the diaphragm mechanism of the adjustable iris, said rack being slidably mounted on a face of said carrier adjacent a lateral edge thereof, said rack having a pin-like formation extending therefrom to be engaged by such sensitized plate holder when the latter is slid into its functioning position on said carrier, thereby to move said rack longitudinally in the direction of the inserting movement of such sensitized plate holder, so as to cause said rack to move longitudinally and thereby to cause said diaphragm mechanism of the adjustable iris to function to close down said iris, the said cooperating iris-closing-and-opening connections to the diaphragm mechanism of the adjustable iris including a shaft extending lengthwise the camera and having a spring coiled thereabout so as to be tensioned by the turning of said shaft consequent upon the positioning of such sensitized plate holder in its functioning position on said carrier, whereby upon the removal of such sensitized plate holder from its functioning position on said carrier the tensioned spring causes the said rack to return to the first position and thereby to open up said iris.

16. A photographic camera of the portrait or view type having a carrier adapted to be positioned either upright or horizontally at the rear of the camera so as to take a picture in either of said positions, and adapted to receive a sensitized plate holder in either of its said positions, iris diaphragm mechanism at the front of said camera for closing down and for opening the iris, and cooperating iris-closing-and-opening connections between said iris diaphragm mechanism and said carrier operable in either position of said carrier upon insertion and upon removal of such plate holder, to act upon said iris diaphragm mechanism, thereby to close down the iris upon insertion of such sensitized plate holder and to open the iris upon removal of such plate holder.

17. A photographic camera of the portrait or view type having a carrier adapted to be positioned either upright or horizontally at the rear of the camera so as to take a picture in either of said positions, and adapted to receive a sensitized plate holder in either of its said positions, iris diaphragm mechanism at the front of said camera for closing down and for opening the iris, a shutter, and cooperating iris-closing-and-opening connections between said iris diaphragm mechanism, said shutter and said carrier, operable in either position of said carrier upon insertion and upon removal of such plate holder, to act upon both said iris diaphragm mechanism and said shutter, to close said shutter when the iris diaphragm is closed down and to open said shutter when the iris diaphragm is moved into open position.

WILLIAM S. KALS.

REFERENCES CITED

The following references are of record in the file of this patent:

UNITED STATES PATENTS

| Number | Name | Date |
|---|---|---|
| 1,361,031 | Eberman | Dec. 7, 1920 |
| 668,888 | Standiford | Feb. 26, 1901 |
| 1,051,591 | Huebner | Jan. 28, 1913 |
| 2,354,168 | Aiken | July 18, 1944 |
| 304,503 | Clark | Sept. 2, 1884 |
| 716,021 | Folmer | Dec. 16, 1902 |
| 1,033,834 | Shukis | July 30, 1912 |
| 929,671 | Ingersoll | Aug. 3, 1909 |
| 1,313,872 | Andrnshes | Aug. 26, 1919 |
| 1,857,706 | Zabrocki | May 10, 1932 |

FOREIGN PATENTS

| Number | Country | Date |
|---|---|---|
| 5,869 | Great Britain | 1888 |